United States Patent [19]

Takaoka

[11] Patent Number: 4,493,940
[45] Date of Patent: Jan. 15, 1985

[54] SUNLIGHT-INTO-ENERGY CONVERSION APPARATUS

[75] Inventor: Daizo Takaoka, Takatsuki, Japan

[73] Assignee: Sanyo Electric Co., Ltd., Osaka, Japan

[21] Appl. No.: 521,604

[22] Filed: Aug. 9, 1983

[30] Foreign Application Priority Data

Aug. 13, 1982 [JP] Japan ................... 57-141525

[51] Int. Cl.³ .................... H01L 31/04; F24J 3/02
[52] U.S. Cl. .................... 136/248; 136/251; 126/418; 126/450
[58] Field of Search .......... 136/248, 251, 259; 126/418, 450

[56] References Cited

U.S. PATENT DOCUMENTS

| | | | |
|---|---|---|---|
| 4,132,220 | 1/1979 | Thomason | 126/450 |
| 4,186,725 | 2/1980 | Schwartz | 126/443 |
| 4,209,347 | 6/1980 | Klein | 136/246 |
| 4,392,008 | 7/1983 | Cullis et al. | 136/248 |

Primary Examiner—Aaron Weisstuch
Attorney, Agent, or Firm—Hubbell, Cohen, Stiefel & Gross

[57] ABSTRACT

The present application discloses a sunlight-into-electrical and thermal energy conversion apparatus wherein a heat collecting plate fitted with a heating medium tube and solar cells is contained in a cubiform container and wherein the upside opening of the cubiform container is covered with a light-permeable glass plate through a metal sealing collar having the same coefficient of thermal expansion as that of the light-permeable glass plate, thereby permitting a large quantity of electrical energy and thermal energy to be extracted simultaneously from a small space of installation and at less cost. Moreover, the completely airtight construction of the combination of the cubiform container and the light-permeable glass plate ensures that the solar cells contained therein are thoroughly protected.

8 Claims, 6 Drawing Figures

SUNLIGHT-INTO-ENERGY CONVERSION APPARATUS

BACKGROUND OF THE INVENTION

1. Field of the Invention

This invention relates to a sunlight-into-energy conversion apparatus for simultaneously converting sunlight energy into thermal and electrical energy, and more particularly to an apparatus of this kind incorporating a heat collecting plate contained in a cubiform container and fitted with solar cells thereon and a heating medium tube on its under surface so as to convert sunlight into electricity and heat efficiently without waste.

2. Description of the Prior Art

An apparatus for converting sunlight into electricity and heat was disclosed, for instance, in the Japanese Official Patent Gazette No. 48227, 1980. The disadvantage is that the use of heating medium tubes and solar cells in a vacuum tube makes the apparatus of that type extremely costly; besides, a number of converters required for obtaining a large quantity of electricity and calories make the apparatus further costly because the quantity of electricity and calories obtainable from a single converter is quite small.

Accordingly, it appears feasible to mount solar cells on the surface of the heat collecting plate (1) of the well known natural circulation type heat collector (A) disclosed in the Official Utility Model Gazette No. 236543, 1981 as shown in FIG. 1, wherein a light-permeable glass plate (3) is installed to cover an upside opening made in a cubiform container (2) constructed of an iron plate and the like by fastening the glass plate to the container with an organic sealant such as a silicon compound or by mechanically fixing them.

However, since the thermal expansivity of the glass plate (3) is by far different from that of the cubiform container (2), thermal strain is produced. For this reason, the portion of the glass connected to the cubiform container (2) is damaged and thus unable to make the inside of the container (2) completely airtight. As a result, moisture allowed to permeate and condense therein causes the electrode of the solar cell to oxidize and ultimately the solar cell itself to deteriorate. This problem has made it impossible to contain solar cells in a cubiform heat collector, though such a cubiform container is, in view of cost reduction, advantageous as an enclosure for installing the cells.

SUMMARY OF THE INVENTION

The present invention, therefore, has as its principal object the provision of a sunlight-into-energy conversion apparatus wherein a heat collecting plate fitted with a heating medium tube formed on its under surface and solar cells thereon is contained in a cubiform container through a heat insulating material, wherein the upside opening of the cubiform container is covered with a light-permeable glass plate, wherein a metal sealing collar is provided between the glass plate and the periphery of the upside opening of the cubiform container, the coefficients of thermal expansion of the metal sealing collar and the glass plate being almost nearly equal, and wherein the sealing collar and the glass plate and the periphery of the opening of cubiform container are connected together, respectively, to make the inside of the cubiform container airtight.

The metal sealing collar employed in the present invention is a framework having a predetermined height. The metal material forming the sealing collar is such that it has almost the same coefficient of thermal expansion as that of the light-permeable glass plate to which it is connected; in other words, it is selected in connection with the material forming the light-permeable glass. For instance, a metal sealing collar made of nickel steel is used when soda-lime glass is used as the light-permeable glass, whereas the collar made of fernico is used when borosilicate glass is employed.

DESCRIPTION OF THE PREFERRED EMBODIMENTS

Figure 1:
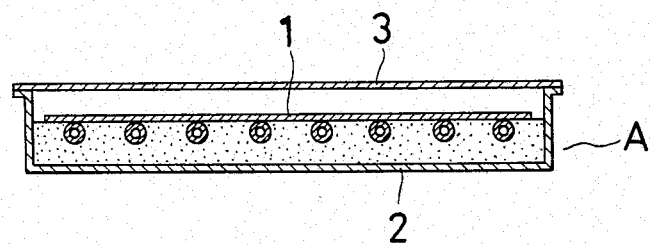
FIG. 1 is a longitudinal sectional view of a conventional solar heat collector.
Figure 2:
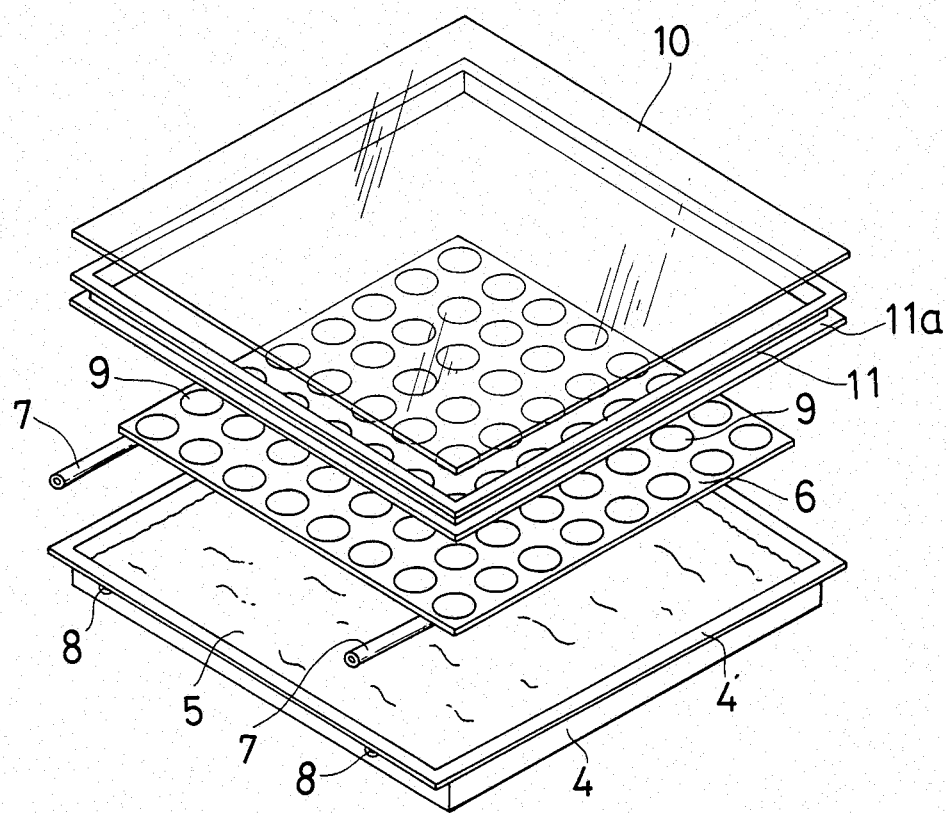
FIG. 2 is an exploded perspective view of one embodiment of the sunlight-into-energy conversion apparatus according to the present invention.
Figure 3:
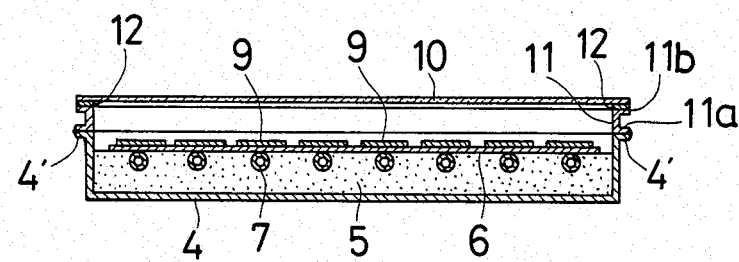
FIG. 3 is a longitudinal sectional view of the example shown in FIG. 2 when it is assembled.

Referring now to FIGS. 2 and 3, one preferred embodiment of present invention will be described. A flange 4' is incorporated with the periphery of the upside opening of a cubiform container 4 prepared by processing a metal plate such as an iron plate into the form of a dish. A heat collecting plate 6 which is an aluminum, copper or iron plate is mounted on a heat insulating material 5 such as glass wool contained in the cubiform container 4. A heat collecting tube 7 made of copper or aluminum and used as a heating medium tube is arranged in a zigzag line in a thermal conductive manner and both its ends are projected from holes 8 made in a side wall of the cubiform container 4 and the projections are welded to the wall. A plurality of circular amorphous semiconductor solar cells 9 are formed on the heat collecting plate 6 and, as one of the electrodes of each cell, an electrode layer is provided on the heat collecting plate 6 itself or via a thin insulating layer thereon, whereas the other electrode is provided on each solar cell 9. A number of these cells 9 are properly connected together in series and parallel so as to correspond to the load requirements and led out by means of leads (not shown) hermetically sealed up in the side wall of the cubiform container 4. There are also provided a light-permeable glass plate 10 covering the upside opening of the cubiform container 4 and a metal sealing collar 11 lying between the glass plate 10 and the flange 4' on the periphery of the upside opening of the cubiform container 4. The metal sealing collar 11 is constructed of a material having a coefficient of thermal expansion roughly equal to that of the glass plate 10 and equipped with a lower flanged end 11a mounted on the flange 4' of the cubiform container 4 and an upper flanged end 11b supporting the glass plate 10.

The following exemplify two combinations of materials for actual use for the glass plate 10 and the sealing collar 11.

(A) Glass plate ... soda lime glass with a coefficient of thermal expansion at $95 \times 10^{-7}/°C$;

Sealing collar ... nickel steel (Ni: 42%, Cr: 6%, Fe: 52%) with a coefficient of thermal expansion at $94 \times 10^{-7}/°C$.

(B) Glass plate ... borosilicate glass (hard glass) with a coefficient of thermal expansion at $51 \times 10^{-7}/°C$.;

Sealing collar ... Fernico ... (Fe: 54%, Ni: 31%, Co: 15%) with a coefficient of thermal expansion at $50 \times 10^{-7}/°C$.

Actual dimensions of the embodiments shown in FIGS. 2 and 3 are as follows:

Glass plate ... $1,800 \times 1,800 \times 3t$ (mm);

Sealing collar ... $1,800 \times 1,800 \times 15h \times 0.3t$ (mm); and

Cubiform container ... $1,800 \times 1,800 \times 45h$ (mm), where t=thickness and h=height.

A description will now be given of how to successfully fasten the glass plate 10 to the sealing collar 11 and then the sealing collar 11 to the cubiform container 4.

In order to fasten the glass plate 10 to the sealing collar 11, frit glass (glass with the low melting point) as a binding agent (12) is applied to the upper flanged end 11b of the sealing collar 11, on which the glass plate 10 is mounted so as to combine them together by heating and fusing the frit glass binding agent 12.

As the frit glass, there are usable:

amorphous frit glass (PbO: about 70%, $B_2O_3$: about 30%) and crystalline frit glass (PbO: about 77%, $B_2O_3$: about 9%, ZnO: about 14%). Their operating temperatures are approximately 400° C.~500° C. and, although the former is readily fused after its solidification at the above temperatures, the latter can be fused only at higher temperatures.

It is important that the coefficients of thermal expansion of the glass plate and the sealing collar are equal when they are combined. The reason for this is that, if the coefficient of thermal expansion of the glass plate differs from that of the sealing collar, the coefficient of contraction of the former will naturally differ from that of the latter when they are cooled to regain the normal temperature because of the operating temperature of the frit glass ranging from 400°~500° C. This difference causes the glass plate to be strained and damaged; otherwise, it leaves the glass plate retaining the strain. Thus the mechanicl strength of the glass plate is minimized and the device becomes unsuitable as a conversion apparatus for outdoor use. However, the aforementioned disadvantage has been eliminated because the glass plate and the sealing collar have almost nearly the same coefficient of thermal expansion. Moreover, even in the case when the conversion apparatus is installed outdoors, the glass plate will not be damaged by the distortion of the cubiform container and the sealing collar heated by sunlight. Furthermore, it is also possible to combine the glass plate and the sealing collar by first attaching a thin copper film to the surface of the glass plate by metallizing and welding the metallized surface to the sealing collar.

Assembly of the energy conversion apparatus according the present invention is completed by combining the glass plate 10 and the sealing collar 11 and welding the sealing collar to the flange 4' of the cubiform container 4 to make its inside airtight.

Regarding the welding method, plasma arc welding, laser welding, argon arc welding, high temperature braze welding using silver solder, and others are usable but the high temperature braze welding among them is most readily carried out from an operational standpoint.

However, the high temperature braze welding is not suitable when amorphous semiconductor solar cells are employed because braze welding with low energy density causes the peripheral region of the braze welding spot to reach a high temperature; consequently, another welding method with high energy density must be relied upon in this case. When silicon solar cells are employed, the high temperature braze welding is acceptable.

As noted above, as long as the cubiform container is kept airtight by fusing the frit glass binding agent between the glass plate and the sealing collar to combine them together and welding the sealing collar to the cubiform container, moisture is not allowed to penetrate into the cubiform container, so that the solar cells are prevented from deteriorating.

Figure 4:
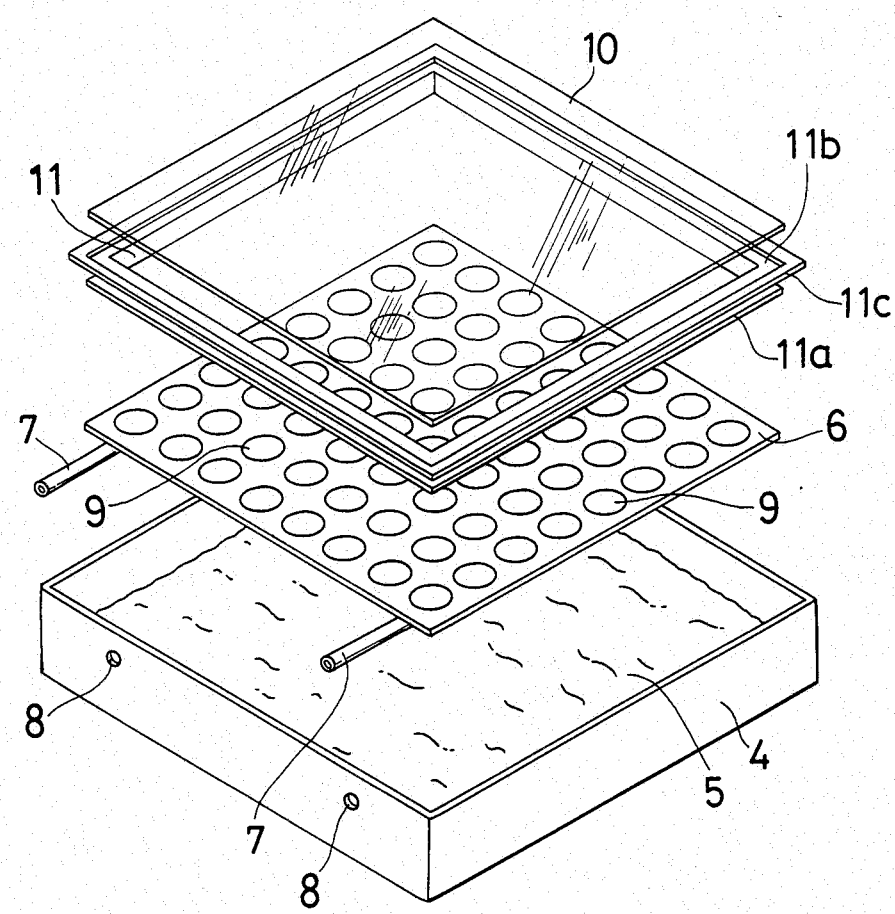
FIG. 4 is an exploded perspective view of another example of the sunlight-into-energy conversion apparatus according to the present invention.
Figure 5:
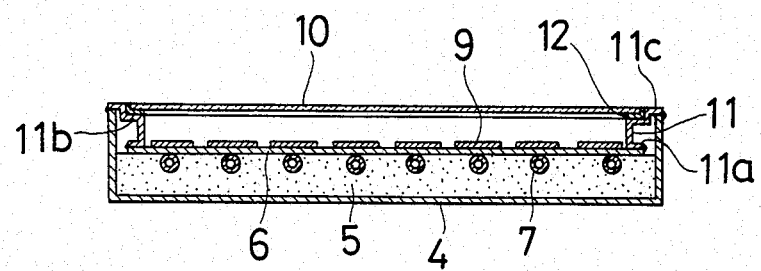
FIG. 5 is a longitudinal sectional view of the example shown in FIG. 4 when it is assembled.

FIGS. 4 and 5 show another embodiment of the present invention wherein a difference from what is shown in FIGS. 2 and 3 relates to an arrangement in which the space enclosed by the glass plate 10, and sealing collar 11 and the heat collecting plate 6 is made much more airtight by welding the heat collecting plate 6 to the sealing collar 11 so as to contain the solar cells 9 in this airtight space. In other words, the heat collecting plate 6 is welded to the lower flanged end 11a of the sealing collar 11, whereas the upper flanged end 11b is outwardly extended to form a step lug 11c to permit fastening of the glass plate 10 onto the upper flanged end 11b with the frit glass binding agent 12 and to permit welding of the step lug 11c to the periphery of the upside opening of the cubiform container 4.

Figure 6:
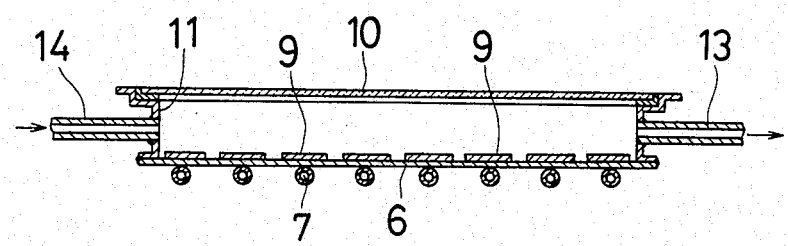
FIG. 6 is a longitudinal sectional view of still another example of the sunlight-into-energy conversion apparatus according to the present invention.

FIG. 6 shows another arrangement so devised as to enclose dry air or an inert gas such as nitrogen gas in the cubiform container 4, the space being much more airtight than what is used to contain solar cells 9 shown in FIGS. 4 and 5. The arrangement comprises the steps of installing a pair of tubes 13, 14 on the sealing collar 11, by means of braze welding, for discharging the air from one tube 13 and injecting dry air or an inert gas and the like through the other 14, and finally cutting the tubes 13, 14 after welding them with pressure.

According to the present invention, it is to be noted that a large quantity of electrical and thermal energy is obtainable simultaneously from a small space of installation and a sunlight-into-electrical and thermal energy conversion apparatus can be obtained with lower production costs.

Moreover, according to the present invention, the portion where the cubiform container and the light-permeable glass are hermetically sealed can be free from damage due to thermal strain and this makes it possible to obtain a sunlight-into-electrical and thermal energy conversion apparatus ensuring that the internally contained solar cells are protected.

What is claimed is:

1. A sunlight-into-electrical and thermal energy conversion apparatus of the type comprising a cubiform container open at the top, a heat insulating material disposed in said container, a heat collecting plate received in said container, said heat collecting plate having a heating medium tube on its lower surface in thermal communication with said heat insulating material and solar cells on its upper surface, and a glass plate secured to said container over the open top thereof; the improvement comprising a metal sealing collar disposed between the glass plate and the periphery of the open top of the cubiform container, frit glass between said glass plate and said sealing collar for sealing said collar to said glass plate, the coefficients of thermal expansion of the metal collar and the glass plate being about equal, and the sealing collar and the periphery of the open top of the cubiform container being sealed together by welding or soldering.

2. The apparatus of claim 1, wherein the glass plate and the metal sealing collar comprise, respectively, either soda-lime glass and nickel or borosilicate glass and fernico.

3. The apparatus of claim 1, wherein the frit glass is amorphous frit glass or crystalline frit glass.

4. The apparatus of claim 1, wherein the soldering is effected by silver solder.

5. The apparatus of claim 1, wherein the heating medium tube is arranged in a zigzag path on the lower surface of the heat collecting plate.

6. The apparatus of claim 1, wherein the solar cells are monocrystalline silicon solar cells or amorphous semiconductor solar cells.

7. The apparatus of claim 1, wherein dry air or an inert gas is enclosed in the cubiform container.

8. The apparatus of claim 1, wherein the lower edge of the metal sealing collar is extended into the cubiform container and continuously fastened to the heat collecting plate.

* * * * *